(12) United States Patent
Bi et al.

(10) Patent No.: US 9,360,627 B2
(45) Date of Patent: Jun. 7, 2016

(54) METHOD AND APPARATUS PROVIDING COMPENSATION FOR WAVELENGTH DRIFT IN PHOTONIC STRUCTURES

(71) Applicant: MICRON TECHNOLOGY, INC., Boise, ID (US)

(72) Inventors: Lei Bi, Boise, ID (US); Roy Meade, Boise, ID (US); Gurtej Sandhu, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 128 days.

(21) Appl. No.: 14/254,173

(22) Filed: Apr. 16, 2014

(65) Prior Publication Data

US 2015/0301283 A1   Oct. 22, 2015

(51) Int. Cl.
G02B 6/12     (2006.01)
G02B 6/293    (2006.01)
G02F 1/025    (2006.01)

(52) U.S. Cl.
CPC ........ *G02B 6/29338* (2013.01); *G02B 6/29398* (2013.01); *G02F 1/025* (2013.01); *G02F 2203/21* (2013.01)

(58) Field of Classification Search
None
See application file for complete search history.

(56) References Cited

U.S. PATENT DOCUMENTS

| | | | |
|---|---|---|---|
| 6,041,071 A * | 3/2000 | Tayebati | G02F 1/035 372/20 |
| 6,407,846 B1 | 6/2002 | Myers et al. | |
| 6,636,668 B1 | 10/2003 | Al-hemyari et al. | |
| 7,327,911 B2 * | 2/2008 | Piede et al. | G02F 1/025 385/129 |
| 7,603,016 B1 * | 10/2009 | Soref | B82Y 20/00 385/129 |
| 9,127,983 B1 * | 9/2015 | Cox et al. | G01J 1/16 |
| 2005/0074194 A1 | 4/2005 | Tan et al. | |
| 2005/0110108 A1 * | 5/2005 | Patel et al. | G02B 6/12004 257/453 |
| 2006/0001089 A1 * | 1/2006 | Bedell et al. | H01L 29/78696 257/347 |
| 2009/0169149 A1 * | 7/2009 | Block | G02F 1/3132 385/9 |
| 2009/0180747 A1 * | 7/2009 | Schrauwen et al. | B82Y 20/00 385/129 |
| 2009/0261383 A1 * | 10/2009 | Mheen et al. | G02F 1/025 257/192 |
| 2009/0314763 A1 | 12/2009 | Chu et al. | |
| 2010/0266232 A1 | 10/2010 | Lipson et al. | |
| 2011/0058765 A1 * | 3/2011 | Xu | G02F 1/025 385/2 |
| 2013/0202005 A1 * | 8/2013 | Dutt | H01L 29/165 372/50.1 |
| 2014/0169724 A1 * | 6/2014 | Ingels | G02F 1/29 385/9 |

OTHER PUBLICATIONS

Y. Amemiya et al. Optical modulator using metal-oxide-semiconductor type Si ring resonator. Optical Review, 16:3:247-251, May/Jun. 2009.*
K. Padmaraju et al. Thermal stabilization of a microring modulator using feedback control. Optics Express, 20:27:27999-28008, Dec. 17, 2012.*
Y. Sebbag et al. Bistability in silicon microring resonator based on strain induced by a piezoelectric lead zirconate titanate thin film. Applied Physics Letters, vol. 100, 141107-1-141107-4, Apr. 2012.*
Chmielak, Bartos et al., "Pockels effect based fully integrated, strained silicon electro-optical modulator", Optical Express, Aug. 29, 2011, vol. 19, No. 18.
Cazzanelli M., et al., "Second-harmonic generation in silicon waveguides strained by silicon nitride", Nature Materials, vol. 11, Feb. 2012.

* cited by examiner

*Primary Examiner* — Mike Stahl
(74) *Attorney, Agent, or Firm* — Perkins Coie LLP

(57) ABSTRACT

A method and apparatus are described which provide for wavelength drift compensation in a photonic waveguide by application of an electric field to a waveguide having a strained waveguide core.

33 Claims, 7 Drawing Sheets

METHOD AND APPARATUS PROVIDING COMPENSATION FOR WAVELENGTH DRIFT IN PHOTONIC STRUCTURES

FIELD OF THE INVENTION

The present invention relates to methods and apparatus for providing wavelength compensation for photonic structures, which may be subject to thermally induced wavelength drift during operation. More specifically, the present invention relates to wavelength compensation for waveguide resonators.

BACKGROUND OF THE INVENTION

Ring or racetrack waveguide resonators are commonly used in integrated photonic circuits as modulators or filters for optical signals. As such, the resonant frequency, usually denoted in terms of wavelength, of the waveguide resonator needs to align with the wavelength of the expected optical signals passing there through, otherwise the modulator or filter performance will be degraded.

The operating wavelength of such resonators can be sensitive to operating conditions such as temperature changes, which can cause wavelength drift. In order to compensate for such thermally induced wavelength drifts, a local microheater can be used to maintain a constant temperature of the waveguide resonator. When a waveguide resonator is locally heated, the heating causes a change in the effective refractive index of the waveguide resonator and produces a stable operational wavelength. The heater holds the waveguide resonator at a desired temperature and thus at a desired operating wavelength.

The heat-based drift compensation mechanism has considerable drawbacks such as slow response, extra energy costs, low accuracy, unidirectional heating only (no cooling down) and is difficult to be applied for practical use in integrated photonic systems.

What is needed is an improved wavelength drift compensation method and apparatus for photonic waveguide resonators.

DETAILED DESCRIPTION OF THE INVENTION

Structural embodiments described below use a strained waveguide core material for a waveguide resonator and an associated biasing structure which applies a voltage across the waveguide resonator to set an effective refractive index of the waveguide resonator and, thus, the resonance wavelength to a desired value, thereby compensating for thermally induced wavelength drift which might otherwise occur.

A strained core material is one in which the material atoms are stretched beyond their normal inter-atomic distance. The strain can be accomplished in several ways in a waveguide, for example, by placing a cladding material having a different thermal coefficient of expansion than the core material in contact with the core material. To further enhance a strain induced in the core material, the core material and cladding can be heated. The strained core material can also be produced by using a cladding material in which the inter-atomic distance is greater than that of the waveguide core material causing the atoms of the core material to stretch and align with those of the cladding material. In addition, certain materials can be used for the waveguide core material, which are inherently strained. It is also possible to strain the waveguide core material by doping it with certain dopants. Silicon is often used as a waveguide core material in photonic systems. Various ways of straining a silicon waveguide core material and its use in photonic systems are described in the articles: Second Harmonic Generation in Silicon Waveguide Strained by Silicon Nitride, by Cozzanelli et al., Nature Materials, Dec. 4, 2011, and Pockels Effect Based Fully Integrated Strained Silicon Electro-Optic Modulator, by Chmielak et al., Optics Express, Aug. 17, 2011.

Figure 1:
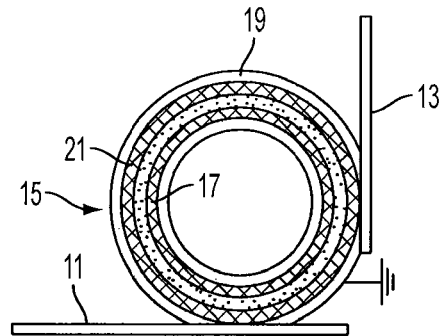
FIG. 1 is a top down view of a waveguide resonant structure in accordance with embodiments of the invention.

Method and structural embodiments will now be described. FIG. 1 illustrates in top view a waveguide resonator 15 which can be used as a modulator or filter in a photonic system. An input waveguide 11 and an output waveguide 13 are evanescently coupled to a waveguide 21 of the waveguide resonator 15. The waveguide resonator 15 includes a closed loop waveguide 21 which is shown in a ring shape, but can be constructed in a race track or other closed loop shape. Also illustrated in FIG. 1 is a bottom electrode 19 electrically coupled to the bottom surface of the waveguide 21, and a top electrode 17 electrically coupled to the top surface of the waveguide 21.

The waveguide 21 includes a strained waveguide core material which permits a change in the effective index of the waveguide 21 upon application of a voltage across the top 17 and bottom 19 electrodes. The electric field produced by the applied voltage causes an alteration in the resonance wavelength of the waveguide 21, which can be used to move and hold a desired wavelength and thus compensate for thermally induced wavelength drift.

Figure 2:
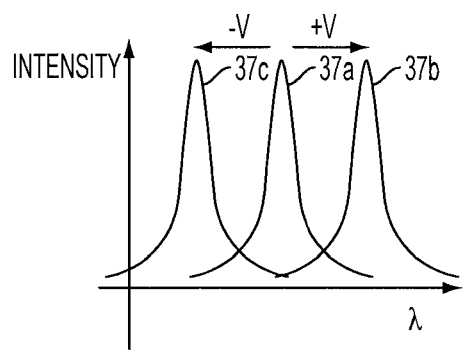
FIG. 2 illustrates changes in resonant wavelength which may be obtained using embodiments of the invention.

FIG. 2 illustrates how a voltage applied across the top 17 and bottom 19 electrodes in FIG. 1 can be used to shift the effective index of the waveguide 21 and thus the resulting wavelength upon application of a voltage. As shown in FIG. 2, the intensity of an optical signal passing through the waveguide 21 has a nominal resonant wavelength 37a which can be shifted as shown by intensity values 37b and 37c by the voltage applied across the top 17 and bottom 19 electrodes of the FIG. 1 structure.

Figure 3:
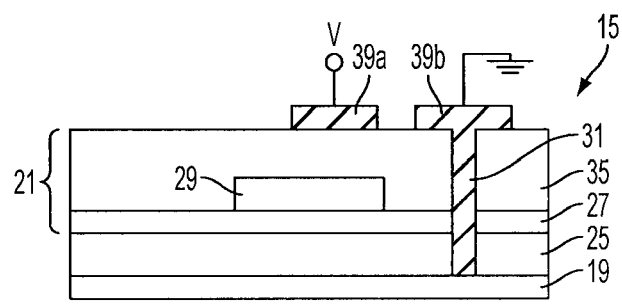
FIG. 3 illustrates in cross-section a structural embodiment.

One specific embodiment of the resonant waveguide 15 is illustrated in FIG. 3, which is a cross-section through a portion of the waveguide resonator 15. As shown, a waveguide core 29, which may comprise silicon, has an associated lower cladding material 27 and an upper and side cladding material 35. Collectively, the lower cladding material 27, waveguide core 29 and upper and side cladding material 35 form a waveguide 21. During fabrication of the lower cladding material 27, the silicon waveguide core 29, and the upper cladding material 35 a strain is introduced in the silicon waveguide core 29. As noted above, the strain may be induced in several different ways. In one example, a silicon waveguide core 29 is in contact with an upper cladding material 39, such as silicon nitride, which has a different thermal coefficient of expansion from that of silicon. This will cause a strain in the silicon waveguide core 29, which is enhanced by heating the materials during an annealing operation. The strain in the silicon waveguide core 29 allows the effective index of the silicon waveguide core 29 to be changed in response to the application of a voltage across the top 39a and bottom 39b electrodes, which correspond to the top 17 and bottom 19 electrodes in FIG. 1, using the well-known Pockels effect. The bias applied across the waveguide 21 results in a tuning of the effective index of the waveguide 21 to a set value which can be used to effectively change and/or maintain the wavelength of the waveguide resonator 15 to a desired value to compensate for thermally induced wavelength drift.

The manner of fabrication of the structural embodiment of illustrated in FIG. 3 is now described with reference to FIGS. 4A-E.

Figure 4A:
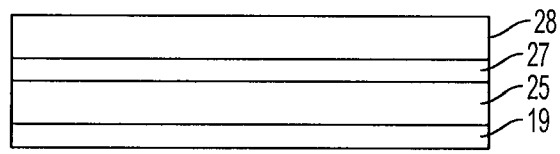
FIGS. 4A-4E illustrate, in cross-section, an embodiment of a method which may be used to form the FIG. 3 embodiment.

FIG. 4A illustrates a starting structure for producing the FIG. 3 embodiment. As shown in FIG. 4a, a substrate 25, which may be silicon or other substrate material, has a bottom cladding material 27 formed thereon. The bottom cladding material 27 and upper cladding material 35, as is well known in the photonics art, has an index of refraction lower than that of the material of the waveguide core. The bottom cladding material 27 can be silicon dioxide or silicon nitride. The waveguide core material, illustrated as material 28 in FIG. 4A, can be silicon. In one embodiment, the substrate 25, bottom cladding material 27 and silicon material 28 can be part of an integral silicon-on-insulator (SOI) substrate.

Figure 4B:
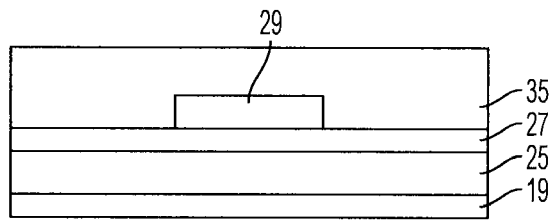

FIG. 4B illustrates the FIG. 4A structure after the silicon waveguide material 28 has been etched to form a silicon waveguide core 29. Following this, an upper cladding material 35 is fabricated over the waveguide core and around its side edges. For a silicon core material 29, suitable materials for the upper cladding can be, for example, silicon nitride, a spin-on dielectric, silicon dioxide and other materials which have a different thermal coefficient of expansion than silicon and which can be heated to increase the strain in the silicon waveguide core 29. After fabrication of the upper cladding material 35, a heat annealing process can be conducted to enhance the strain in the silicon waveguide core 29.

Other techniques for inducing strain in the silicon waveguide core 29, as described above, can also be used to form a strained silicon waveguide core 29. Alternatively, a material 28 can be used for the waveguide core 29, which is inherently strained.

FIGS. 4A and 4B also illustrate the formation of a conductive material 19 beneath the substrate 25. This layer may be formed by a depositing doped polysilicon or any metal material, e.g., copper, aluminum, commonly used in the manufacture of integrated circuits.

Figure 4C:
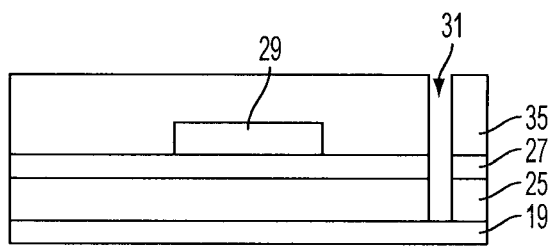
Figure 4D:
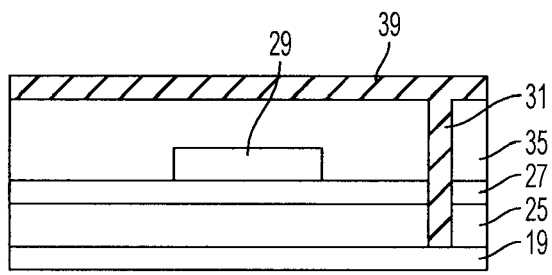

FIG. 4C illustrates the formation of via 31 in the FIG. 4B structure down to the level of the conductive material 19. This via 31 is formed by conventional anisotropic etching techniques, well known in the art. FIG. 4D illustrates the formation of a conductive material 39 over the FIG. 4C structure, which both fills via 31 and provides an overlying conductive material 39 over the upper cladding material 35.

Figure 4E:
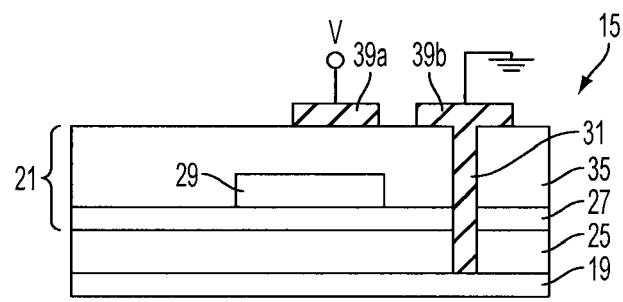

FIG. 4E illustrates subsequent etching of the conductive material 39 to form separate electrodes 39a and 39b, with electrode 39 corresponding to the top electrode 17 (FIG. 1) and electrode 39b connecting to the bottom electrode 19.

Because strain in the waveguide core 29 induces a second order non-linear optical effect, the so-called Pockels effect, in the waveguide core 29, the effective index of the waveguide 21 can be changed with an applied voltage across the conductors 39a and 39b. This will correspondingly change the operating wavelength of waveguide resonator 15. As will be explained below, control techniques can be developed which apply a voltage across the conductors 39a and 39b to set and/or maintain a desired wavelength and which can compensate for thermally induced wavelength drift during operation of the waveguide resonator 15.

Figure 5:
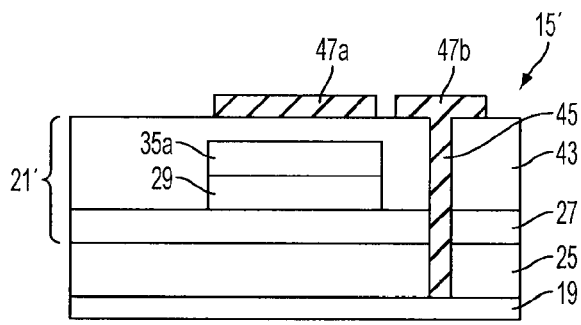
FIG. 5 illustrates in cross-section a structural embodiment.

FIG. 5 illustrates in cross-section a second structural embodiment of a waveguide resonator 15'. The embodiment illustrated in FIG. 5 differs from the embodiment shown in FIG. 3 in that it further includes a thermo-optic compensation cladding material 43 as part of the waveguide 21. The thermo-optic compensation cladding material 43 can be used to help reduce drift in the resonant wavelength of the waveguide resonator 21 due to temperature changes. The thermo-optic compensation cladding layer 43 has a negative thermal optical coefficient compared with the positive thermal optical coefficient of silicon waveguide core 29. Although the FIG. 5 structure can reduce wavelength drift caused by thermal effects, nevertheless, the illustrated structure can still be fine-tuned with an applied voltage to set and/or maintain a desired wavelength and compensate for any actual thermal drift. The FIG. 5 embodiment is now described with respect to its method of fabrication shown in FIGS. 6A-6F.

Figure 6A:
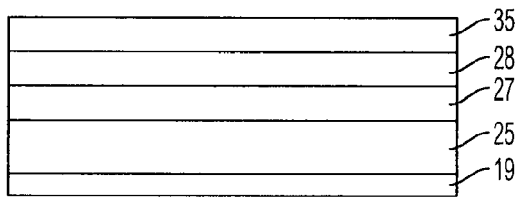
FIGS. 6A-6F illustrate, in cross-section, an embodiment of a method which may be used to form the FIG. 5 embodiment.

The starting structure illustrated in FIG. 6A includes the bottom conductor 19, substrate 25, lower cladding material 27, core material 28, and upper cladding material 35. The various materials used are the same as those used in the FIG. 4A-4E fabrication method. As with FIG. 5, the substrate 25, lower cladding material 27, and core material can be part of a silicon-on-insulator (SOI) substrate. As was described above with respect to FIG. 5B, a strain is induced in the waveguide core 29 by having the waveguide core 29 have a different thermal coefficient of expansion than the upper cladding material 35a. For example, the waveguide core 29 material can be silicon and the upper cladding material 35a can be silicon nitride, and the strain induced in the silicon core material can be enhanced by a thermal anneal.

Figure 6B:
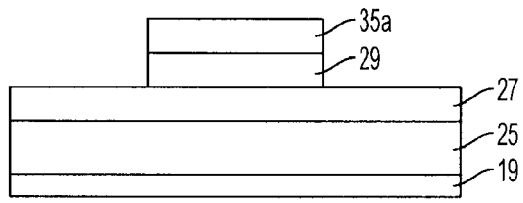
Figure 6C:
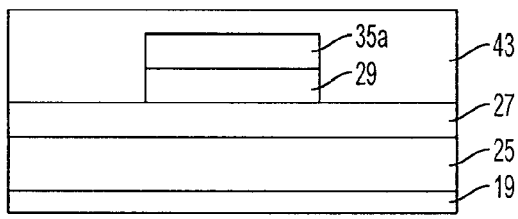

As illustrated in FIG. 6B, an anisotropic etch is performed on the upper cladding material 35 and waveguide material 28 to form the upper cladding 35a and waveguide core 29. The thermal anneal can be applied before or after the etching of the upper cladding 35a and waveguide core 29. Alternatively, other methods described above can be used to induce a strain in the silicon waveguide core 29.

Following the anisotropic etching illustrated in FIG. 6B, a thermo-optic compensation cladding material 43 is applied. This material has a negative thermal optical coefficient compared to the positive thermal optic coefficient of silicon waveguide core 29. This material can be a well-known negative coefficient of expansion polymer, for example, those polymers described in European published application EP 06885515 A1, which is incorporated by reference herein in its entirety. Other materials which can be used for material 43 include negative coefficient of expansion ceramics and metal oxides, with titanium oxide being one example of a suitable metal oxide.

Figure 6D:
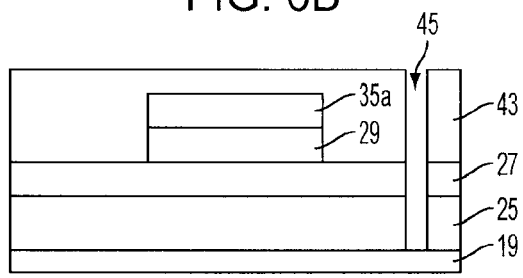
Figure 6E:
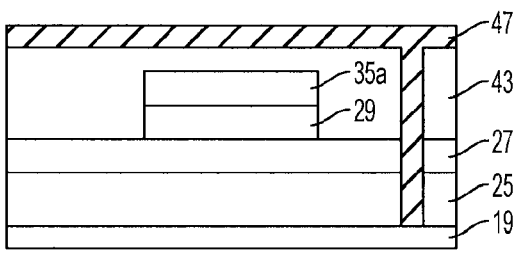

As shown in FIG. 6D, a via 45 is anisotropically etched through the thermo-optic compensation cladding material 43, the lower cladding 27, and the substrate 25 to the conductive material 19. Subsequently, as shown in FIG. 6E, a conductive material 47 is applied within via 45 and over the thermal-optic compensation cladding material 43. This conductive material can be a doped polysilicon or a metal layer, for example, of copper, aluminum, or other metal typically used in integrated circuit fabrication.

Figure 6F:
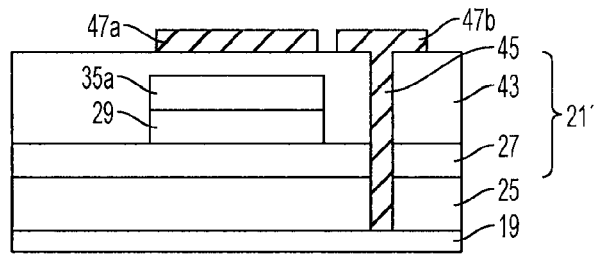

As shown in FIG. 6F, the conductive material 47 over the thermo-optic compensation cladding material 43 can be etched to form two conductors 47a and 47b which will allow a voltage to be applied across the waveguide resonator 15' to shift and/or maintain the resonant wavelength.

Figure 7:
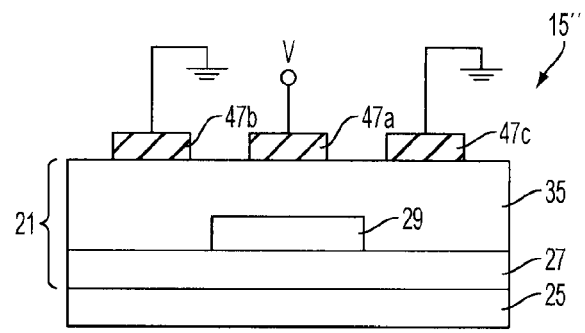
FIG. 7 illustrates in cross-section a structural embodiment.

FIG. 7 illustrates another structural embodiment of a wavelength resonator 15". As shown in FIG. 7, electrodes 47a, 47b, 47c are provided for waveguide 21. The electrodes 47a, 47b, 47c are provided solely on the upper surface of the upper cladding material 35. The manner of fabricating the FIG. 7 embodiment is now described with reference to FIGS. 8A-8D.

Figure 8A:
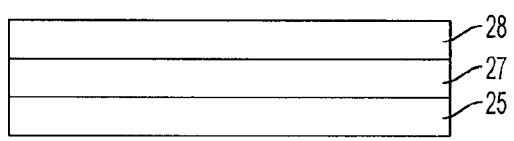
FIGS. 8A-8D illustrate, in cross-section, an embodiment of a method which may be used to form the FIG. 7 embodiment.

Referring first to FIG. 8A, the starting structure includes substrate 25, a lower cladding layer 27 and a material 28, such as silicon which can be used to form the waveguide core. Again, the various materials in the FIG. 8A structure can be parts of a silicon-on-insulator (SOI) substrate.

Figure 8B:
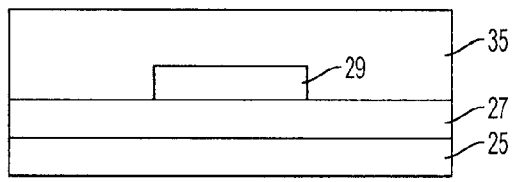

As illustrated in FIG. 8B, waveguide core 29 is formed by etching the waveguide material 28. Subsequently, an upper cladding layer 35 is fabricated. As with prior embodiments, a strain is produced within the waveguide core 29 during fabrication of the waveguide core 29 and upper cladding material 35 in the manner described above.

Figure 8C:
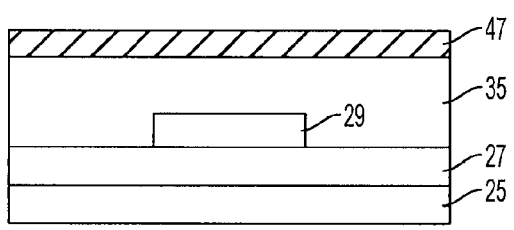
Figure 8D:
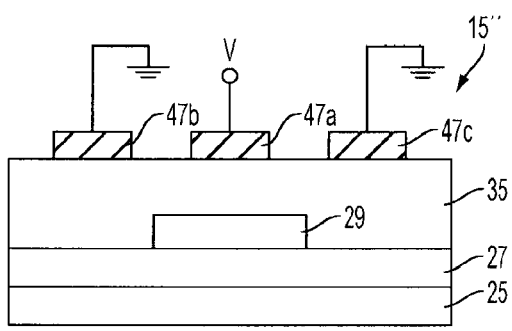

As shown in FIG. 8C, an upper conductive material 47 is formed over the upper cladding material 35, which, as shown in FIG. 8D, is then selectively etched to produce three conductive areas 47a, 47b, and 47c. As shown in FIG. 8D, the central conductive area 47a is used for application of a positive voltage while the outer conductive areas 47b and 47c are grounded. As in the prior embodiments, application of a voltage to the conductive areas 47a, 47b and 47c can adjust the effective index of waveguide 21 and the resonant wavelength of waveguide resonator 15". In this embodiment, no bottom electrode is required making for a simplified processing to produce the overall structure. In addition, although FIGS. 7 and 8C show three conductive areas 47a, 47b, and 47c on the upper surface of the upper cladding material 35, in an alternative embodiment only two spaced conductive areas are formed, one for connection to a positive voltage, and the other for connection to ground.

Figure 9:
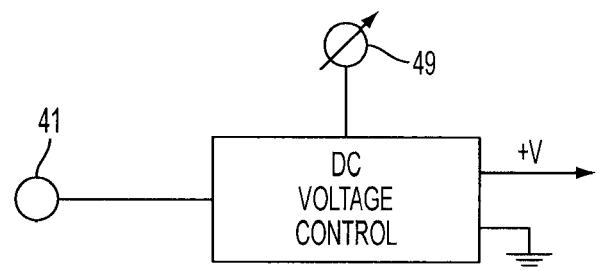
FIG. 9 illustrates a control circuit which can be used with the various embodiments of the invention.

FIG. 9 illustrates a DC voltage control circuit which can be used to continuously supply an operating voltage to the various structural embodiments described above. The DC voltage control circuit can be fabricated as a CMOS circuit on a common substrate 25 used to fabricate the waveguide resonator 15 (15', 15"). The control circuit includes a set point adjustor 49 for initially setting a voltage to set the waveguide resonator 15 (15', 15") at a desired operating wavelength. Also shown is a temperature sensor 41 for sensing ambient temperature during operation of the waveguide resonator 15 (15', 15"). Alternatively, sensor 41 can be a wavelength sensor which senses the actual resonant wavelength of waveguide resonator 15 (15', 15").

Figure 10:
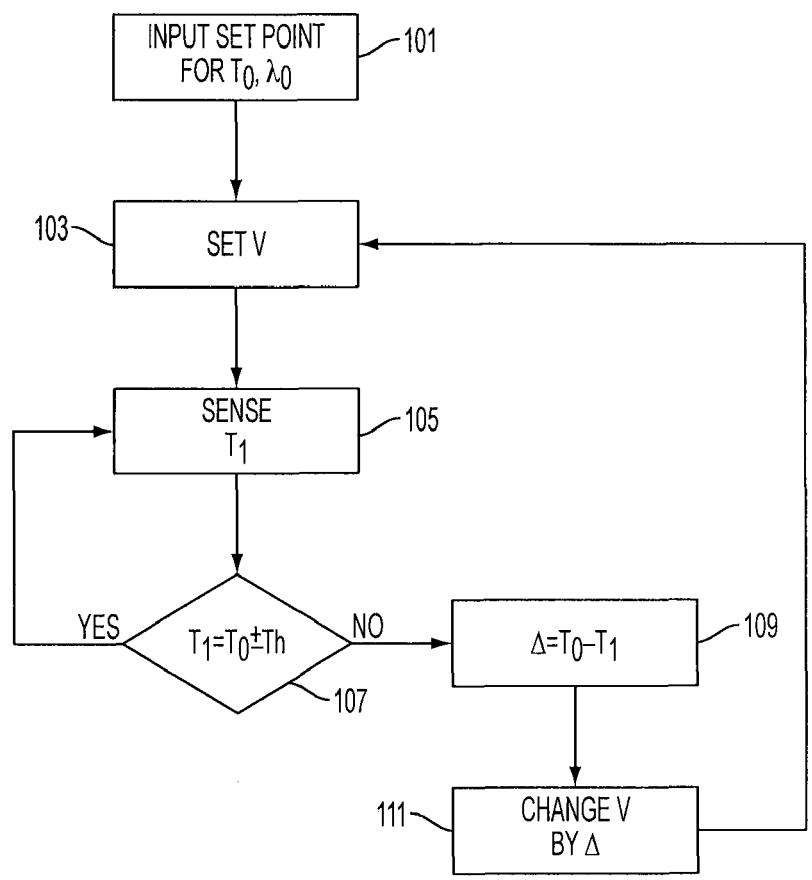
FIG. 10 illustrates an embodiment of a control algorithm, which can be used in the FIG. 9 control circuit.

FIG. 10 illustrates a control algorithm for use by the DC voltage control circuit. A firmware or software controlled digital processor or an analog signal processor within the circuit can execute the control algorithm illustrated in FIG. 10. As a first step 101 an input set point for an anticipated operating temperature $T_0$ for a desired operating wavelength $\lambda_0$ is set by way of set point adjuster 49. In step 103 the input set point is converted to a set point output voltage. As noted, this can be done by analog or digital techniques. For example, if a digital processor is used a look-up function can be used which relates an initial temperature $T_0$, and wavelength $\lambda_0$ to a particular voltage output. This set point can be used to compensate for fabrication variations and tune the wavelength $\lambda_0$ to a desired operating value.

Following step 103, a temperature $T_1$ is sensed in step 105 using temperature sensor 41. If the sensed temperature $T_1$ is within a predetermined threshold $T_0 \pm Th$, which is a prescribed temperature band around the set point temperature $T_0$, then no changes are made in the output voltage V and the process returns to step 105. However, if the sensed temperature $T_1$ is outside the predetermined threshold band $T_0 \pm Th$, then a $\Delta$ value is computed as a plus or minus difference between the sensed temperature $T_1$ and the set temperature $T_0$. This plus or minus difference value A is then used in step 111 to change the output voltage V up or down so that the operating wavelength returns to the initial desired operating wavelength $\lambda 0$. Once the step 111 is executed, the process returns back to step 103 where the voltage is set and the process continues.

Figure 11:
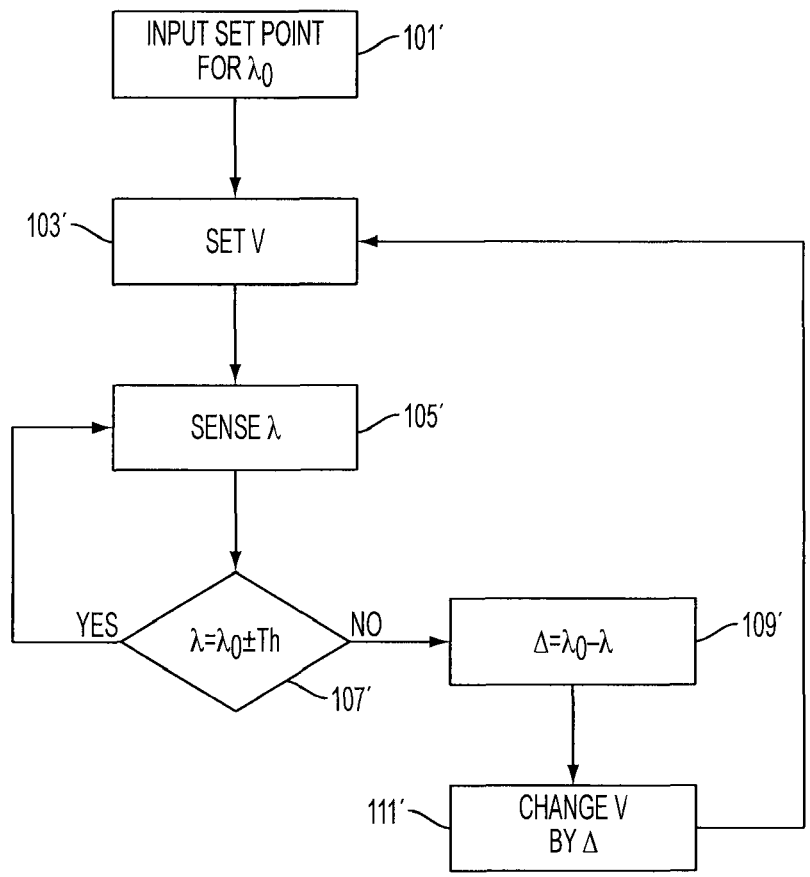
FIG. 11 illustrates an embodiment of another control algorithm, which can be used in the FIG. 9 control circuit.

Instead of sensing the temperature $T_1$ the control algorithm for control circuit 48 can sense an operating wavelength $\lambda$ of the waveguide resonator 15 (15', 15"), which can be used to adjust the output voltage and thus operating wavelength to a desired value $\lambda 0$ as shown in FIG. 11. As was true with the FIG. 10 process, the FIG. 11 process starts with step 101' where an input set point for a desired operating wavelength $\lambda 0$ is set. Step 103' converts the wavelength set point $\lambda 0$ into an output voltage which is applied to the waveguide resonator 15 (15', 15"). Then in step 105', the operating wavelength $\lambda$ is sensed, following which, in step 107', a determination is made whether the operating wavelength $\lambda$ is within a predetermined threshold band $\lambda 0 \pm Th$ centered around the desired wavelength $\lambda 0$. If it is, the process returns to step 105'. However, if the sensed operating wavelength $\lambda$ is not within a predetermined threshold band $\lambda 0 \pm Th$ then a plus or minus difference $\Delta$ is calculated in step 109' between the sensed $\lambda$ and set $\lambda 0$, which is then used to change the applied voltage in step 111' following which the newly calculated voltage is set in step 103' and the process resumes.

It should be noted that the initial set point adjustments of the initial desired wavelength in step 101 of the FIGS. 10 and 11 processes can be omitted if the fabrication processes are precise enough to produce a consistent initial desired operating wavelength for the wavelength resonator 15 (15', 15"). Otherwise, the initial set point adjustments can be used to compensate the waveguide resonator 15 (15', 15") for any fabrication variations which would produce a resonant wavelength which differs from that desired.

As can be understood from the foregoing, the various embodiments provide a very fast and efficient manner for adjusting for thermal drift as well as fabrication anomalies in a photonic waveguide resonator, for example, a filter or a modulator, by using an applied voltage in conjunction with a strained waveguide core.

In the embodiments described above strained silicon is used as the waveguide core material 29. However, other strained waveguide core materials may be used in place of silicon, which can be exploited by an applied electric field to tune and maintain the waveguide resonator to a particular effective index corresponding to a desired operating wavelength. Such materials include GaAs, $I_NP$, $Si_x Ge_{1-x}$ as examples. Other materials which can be strained and used to form the waveguide core including any group III to group IV materials. As noted, some materials used for the waveguide core 29 can inherently have a strain therein.

In the embodiments described above, a strain is produced in a silicon waveguide core 29 by using an upper cladding material 35 which has a different thermal coefficient of expansion than that of silicon. However, the strain also can be produced using the lower 27 cladding material or by using both the upper 45 and lower 27 cladding materials.

It further should be noted that for a silicon waveguide core 29 the effective index of waveguide 21 is dependent on the field strength applied by the external voltage and the direction in this material. The various embodiments show ways in which the field can be applied using the top 17 and bottom 19 electrodes; however, other arrangements for controlling the electric field can also be employed.

For a silicon waveguide core 29, the upper 35 and lower 27 cladding materials can include silicon nitride, SiOxNy, $SiO_2$, spin on dielectric (SOD), hydronated $SiO_2$, $TiO_2$, $ZrO_2$, $HfO_2$, $AL_2O_3$, as well as other dielectrics having thermal expansion coefficients different from that of the silicon waveguide core 29.

Although various method and structural embodiments have been described above, it is apparent that changes can be made to both without departing from the spirit or scope of the invention. Accordingly, the invention is not limited by the description above of the specific embodiments, but is only limited by the scope of the appended claims.

What is claimed as new and desired to be protected by Letters Patent of the United States is:

1. An optical structure comprising:
    a waveguide resonator comprising an optical input, an optical output, and a waveguide having a resonant wavelength, the waveguide comprising a strained waveguide core over a lower cladding and an upper cladding disposed over the waveguide core;
    a thermo-optic compensating material on the upper cladding, wherein the thermo-optic compensating material has a negative thermo-optic coefficient and the waveguide core material has a positive thermo-optic coefficient; and
    at least a pair of electrodes electrically coupled to the waveguide resonator for providing an electric field which changes the resonant wavelength of the waveguide resonator.

2. An optical structure as in claim 1, wherein at least a portion of the cladding has a thermal coefficient of expansion different from that of the waveguide core.

3. An optical structure as in claim 1, wherein the strain in the strained waveguide core is produced by at least a portion of the at least one cladding.

4. An optical structure as in claim 1, further comprising:
    a control device for applying a voltage to the electrodes to change the resonant wavelength of the waveguide resonator.

5. An optical structure as in claim 4, wherein the control device is coupled to a temperature sensor for detecting a temperature affecting the waveguide resonator; and develops a voltage, based on a sensed temperature, which is applied to the electrodes.

6. An optical structure as in claim 5, further comprising a temperature set point device coupled to the control device for developing a voltage for setting a wavelength set point.

7. An optical structure as in claim 4, wherein the control device is coupled to a wavelength detector for detecting a wavelength of the waveguide resonator, and developing a voltage based on a detected wavelength, which is applied to the electrodes.

8. An optical structure as in claim 7, further comprising a wavelength set point device coupled to the control device for setting a wavelength set point.

9. An optical structure as in claim 5, wherein the resonant wavelength of the waveguide resonator occurs at a first operating temperature and the control device applies a voltage to the electrodes which changes the value of the resonant wavelength in accordance with temperature deviations from the first operating temperature.

10. An optical structure as in claim 4, wherein the control device is on a common substrate with the waveguide resonator.

11. An optical structure as in claim 1, wherein at least one of the lower cladding and upper cladding provides a strain to the waveguide core.
    forming a waveguide core.

12. An opticial structure as in claim 11, wherein the upper cladding provides a strain to the waveguide core material.

13. An optical structure as in claim 1, wherein the waveguide core comprises one of Si, GaAs, InP, $Si_xGe_{1-x}$.

14. An optical structure as in claim 12, wherein the upper cladding material comprises one of silicon nitride, $SiO_xN_y$, a spin on dielectric, $SiO_2$, $TiO_2$, $ZrO_2$, $HfO_2$, and $Al_2O_3$.

15. An optical structure as in claim 1, wherein the lower cladding comprises a silicon oxide.

16. An optical structure as in claim 15, wherein the silicon oxide is part of a silicon on insulator structure.

17. An optical structure as in claim 1, wherein a first one of the electrodes is below the lower cladding and a second one of the electrodes is over the upper cladding.

18. An optical structure as in claim 1, further comprising a thermo-optic compensating cladding between at least one of the electrodes and the upper cladding.

19. An optical structure as in claim 1, wherein a first one of the electrodes is electrically coupled to the upper cladding and a second one of the electrodes is electrically coupled to the upper cladding at a location spaced from the first one of the electrodes.

20. An optical structure as in claim 19, further comprising a third electrode electrically coupled to the upper cladding at a location spaced from the first and second electrodes.

21. A method of forming an optical structure, the method comprising:
    forming a waveguide resonator having an optical input and an optical output, and a waveguide by:
        forming a waveguide core over a lower cladding material provided on a substrate;
        forming an upper cladding over the waveguide core, wherein at least one of the upper and lower claddings produces a strain in the waveguide core; and
        forming a thermo-optic compensating material on the upper cladding, wherein the thermo-optic compensating material has a negative thermo-optic coefficient and the waveguide core material has a positive thermo-optic coefficient; and
    forming electrodes for applying an electric field to the waveguide core to change the operating resonant wavelength of the resonator structure.

22. A method of forming an optical structure as in claim 21, further comprising:
    forming a first electrode in electrical communication with the upper cladding material; and
    forming a second electrode in electrical communication with at least one of the upper and lower cladding.

23. A method of forming an optical structure as in claim 22, wherein the second electrode is in electrical communication with the upper cladding and is spaced from the first electrode.

24. A method of forming an optical structure as in claim 22, wherein the second electrode is in electrical communication with the lower cladding.

25. A method of forming an optical structure as in claim 23, further comprising forming a third electrode in electrical communication with the upper cladding and spaced from the first and second electrodes.

26. A method of forming an optical structure as in claim 21, wherein the forming of an upper cladding comprises forming the upper cladding material over the waveguide core and heating the upper cladding and waveguide core to strain the waveguide core.

27. A method of forming an optical structure as in claim 21, wherein the waveguide core comprises one of Si, GaAs, InP, $Si_xGe_{1-x}$.

28. A method of forming an optical structure as in claim 21, wherein the upper cladding material comprises one of silicon nitride $SiO_xN_y$, a spin on dielectric, $SiO_2$, $TiO_2$, $ZrO_2$, $HfO_2$, and $Al_2O_3$.

29. A method of forming an optical structure as in claim 21, further comprising forming a temperature sensor and a control device connected to the temperature sensor for controlling a voltage applied to the electrodes in response to detected changes in temperature.

30. A method of forming an optical structure as in claim 21, further comprising forming a wavelength detector and a control device connected to the wavelength detector for controlling a voltage applied to the electrodes in response to detected changes in wavelength.

31. A method of forming an optical structure as in claim 29, wherein the control device and waveguide resonator are formed on a common substrate.

32. A method of forming an optical structure as in claim 30, wherein the control device and waveguide resonator are formed on a common substrate.

33. A method of forming an optical structure as in claim 21, wherein the thermo-optic compensating material comprises one of a polymer and titanium oxide.

* * * * *